(12) United States Patent
McGuire

(10) Patent No.: US 9,034,180 B2
(45) Date of Patent: May 19, 2015

(54) REACTOR TANK

(71) Applicant: Ecosphere Technologies, Inc., Stuart, FL (US)

(72) Inventor: Dennis McGuire, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 0 days.

(21) Appl. No.: 14/252,900

(22) Filed: Apr. 15, 2014

(65) Prior Publication Data

US 2014/0290957 A1    Oct. 2, 2014

Related U.S. Application Data

(60) Division of application No. 12/765,971, filed on Apr. 23, 2010, now Pat. No. 8,721,898, which is a continuation-in-part of application No. 12/399,481, filed on Mar. 6, 2009, now Pat. No. 7,699,988, which is a continuation-in-part of application No. 12/184,716, filed on Aug. 1, 2008, now Pat. No. 7,699,994.

(60) Provisional application No. 60/953,584, filed on Aug. 2, 2007.

(51) Int. Cl.
*C02F 1/36* (2006.01)
*C02F 9/00* (2006.01)
(Continued)

(52) U.S. Cl.
CPC . *C02F 1/36* (2013.01); *C02F 1/283* (2013.01); *C02F 1/32* (2013.01); *C02F 1/385* (2013.01); *C02F 1/40* (2013.01); *C02F 1/441* (2013.01); *C02F 1/444* (2013.01); *C02F 1/4602* (2013.01); *C02F 1/4672* (2013.01); *C02F 1/5236* (2013.01); *C02F 1/78* (2013.01); *C02F 9/00* (2013.01); *C02F 2001/46119* (2013.01); *C02F 2101/20* (2013.01); *C02F 2201/008* (2013.01);
(Continued)

(58) Field of Classification Search
USPC ............ 210/748.01, 638, 660, 205, 177, 190, 210/721, 665, 702, 748.02, 243, 153; 166/90.1, 267; 422/20, 22, 127, 128, 422/186
See application file for complete search history.

(56) References Cited

U.S. PATENT DOCUMENTS 3,523,891 A    8/1970 Mehl
3,664,951 A    5/1972 Armstrong
(Continued)

OTHER PUBLICATIONS

W. Kerfoot, "Gas and oil recovery in shale deposits", U.S. Appl. No. 60/908,453, filed Mar. 28, 2007.
(Continued)

*Primary Examiner* — Walter D Griffin
*Assistant Examiner* — Cameron J Allen
(74) *Attorney, Agent, or Firm* — McHale & Slavin, P.A.

(57) ABSTRACT

Disclosed is an improved water treatment cavitation reactor cone. The tank operates on a continuous flow of fluids which are subjected to ultrasonic waves in combination with a high level of injected ozone. The treatment tank includes a tangential inlet that induces a rotating flow into the tank thereby increasing the mixing of the ozone within the effluent. The effluent is further treated with DC current. The treatment tank provides a cost efficient and environmentally friendly process and apparatus for cleaning and recycling fluids as contaminated as frac water, used to stimulate gas production from shale formations, as well as other types of fluids having various levels of contaminants such as aerobic and anaerobic bacteria and suspended solids. The calcium carbonate scaling tendency is reduced to an acceptable level without the use of acids, ion exchange materials, or anti scaling chemicals which is of economical and environmental significance and benefit.

21 Claims, 15 Drawing Sheets

(51) Int. Cl.
*E21B 43/26* (2006.01)
*C02F 1/28* (2006.01)
*C02F 1/32* (2006.01)
*C02F 1/38* (2006.01)
*C02F 1/40* (2006.01)
*C02F 1/44* (2006.01)
*C02F 1/46* (2006.01)
*C02F 1/467* (2006.01)
*C02F 1/52* (2006.01)
*C02F 1/78* (2006.01)
*C02F 1/461* (2006.01)
*C02F 101/20* (2006.01)

(52) U.S. Cl.
CPC ..... *C02F2201/4617* (2013.01); *C02F 2303/16* (2013.01); *E21B 43/26* (2013.01)

(56) References Cited

U.S. PATENT DOCUMENTS

| | | | |
|---|---|---|---|
| 3,706,646 | A | 12/1972 | Gibson, Jr. et al. |
| 3,989,608 | A | 11/1976 | DeMonbrun et al. |
| 4,003,832 | A | 1/1977 | Henderson et al. |
| 4,076,617 | A | 2/1978 | Bybel et al. |
| 4,957,606 | A | 9/1990 | Juvan |
| 5,679,257 | A | 10/1997 | Coate et al. |
| 5,868,945 | A | 2/1999 | Morrow et al. |
| 5,897,765 | A | 4/1999 | Mercier |
| 6,182,453 | B1 | 2/2001 | Forsberg |
| 6,221,260 | B1 | 4/2001 | Chahine et al. |
| 6,555,011 | B1 | 4/2003 | Tribelsky et al. |
| 6,818,128 | B2 | 11/2004 | Minter |
| 6,902,678 | B2 | 6/2005 | Tipton |
| 6,911,153 | B2 | 6/2005 | Minter |
| 7,093,661 | B2 | 8/2006 | Olsen |
| 7,131,638 | B2 | 11/2006 | Kerfoot |
| 7,156,984 | B2 | 1/2007 | Kerfoot |
| 7,247,244 | B2 | 7/2007 | Kozyuk |
| 7,326,002 | B2 | 2/2008 | Kerfoot |
| 7,384,563 | B2 | 6/2008 | Harmless et al. |
| 7,481,937 | B2 | 1/2009 | Rice et al. |
| 7,595,003 | B2 | 9/2009 | Maddox |
| 7,699,988 | B2 | 4/2010 | McGuire et al. |
| 7,699,994 | B2 | 4/2010 | McGuire et al. |
| 2007/0160493 | A1 | 7/2007 | Ronholdt et al. |
| 2007/0240975 | A1* | 10/2007 | Foret ................ 204/157.15 |
| 2008/0061006 | A1 | 3/2008 | Kerfoot |
| 2008/0237141 | A1 | 10/2008 | Kerfoot |
| 2011/0024361 | A1 | 2/2011 | Schwartzel et al. |

OTHER PUBLICATIONS

Allegheny Ozone, "Treating frac water with ozone", Allegheny Ozone, Inc. (Dec. 11, 2009).

Y. Cong et al, "Hydroxyl radical electrochemically generated with water as the complete atom source and its environmental application", Chinese Science Bulletin, 52(10):1432-1435 (May 2007).

K. Klasson et al, "Ozone treatment of soluble organics in produced water (FEAC307)", Milestone Report: Letter Report with the Summarized Results from Continuous-flow Testing, pp. 1-18, Oak Ridge National Laboratory, Oak Ridge, Tennessee (Dec. 2000).

K. Klasson et al, "Ozone treatment of soluble organics in produced water", Petroleum Environmental Research Forum Project 98-04, pp. 1-85, Oak Ridge National Laboratory, Oak Ridge, Tennessee (Jan. 2002).

T. Klasson, "Treatment of water-soluble organics in produced water", pp. 1-2 (Dec. 11, 2009).

* cited by examiner

| DISSOLVED GASSES | PPM |
|---|---|
| HYDROGEN SULFIDE | 0.0 |
| CARBON DIOXIDE | ND |
| DISSOLVED OXYGEN | ND |

| FLUID CONDITIONS | |
|---|---|
| LAB TEMP | 75 °F |
| FIELD TEMP | ND °F |
| FIELD PRESSURE | ND |
| SpGr. | 1.097 |
| RESISTIVITY | 0.074 Ohm-m |
| pH | 6.090 |

| CATIONS | mg/L | meq/L |
|---|---|---|
| SODIUM | 31,309.9 | 1361.3 |
| CALCIUM | 15,705 | 785.3 |
| MAGNESIUM | 2,525 | 207.0 |
| BARIUM | 209.2 | 3.05 |
| IRON | 93.3 | 3.3 |
| MANGANESE | 3.508 | 0.13 |
| STRONTIUM | 490.60 | 11.20 |

| ANIONS | mg/L | meq/L |
|---|---|---|
| BICARBONATE | 97.6 | 1.6 |
| CHLORIDE | 84,092 | 2368.8 |
| SULFATE | 40 | 0.8 |

| | mg/L |
|---|---|
| TOTAL DISSOLVED SOLIDS | 134,566 |
| TOTAL IONIC STRENGTH | 2.86 |
| TOTAL HARDNESS AS CaCO3 | 48,585 |

CALCIUM CARBONATE SCALING TENDENCY

STABILITY INDEX:

| °F | |
|---|---|
| 50 | -0.51 |
| 68 | -0.33 |
| 77 | -0.23 |
| 86 | -0.14 |
| 104 | 0.08 |
| 122 | 0.35 |
| 140 | 0.65 |
| 158 | 0.98 |
| 176 | 1.36 |
| 194 | 1.77 |
| 212 | 2.21 |

CALCIUM CARBONATE INDEX LEGEND
SI OF LESS THAN 0 = NO POTENTIAL
SI OF 0 TO 0.5 = MARGINAL POTENTIAL
SI OF 0.5 TO 1.0 = MODERATE POTENTIAL
SI OF ABOVE 1.0 = SEVERE POTENTIAL

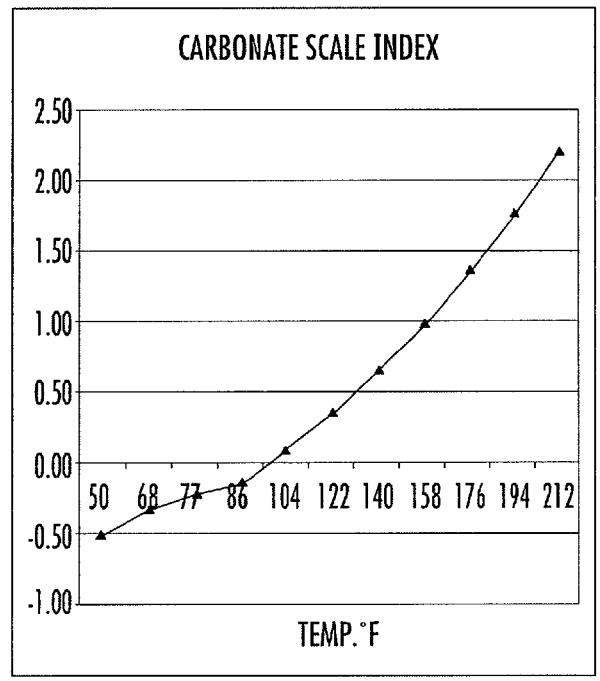

FIG. 14A

| DISSOLVED GASSES | PPM |
|---|---|
| HYDROGEN SULFIDE | 0.0 |
| CARBON DIOXIDE | ND |
| DISSOLVED OXYGEN | ND |

| FLUID CONDITIONS | |
|---|---|
| LAB TEMP | 75 °F |
| FIELD TEMP | ND °F |
| FIELD PRESSURE | ND |
| SpGr. | 1.098 |
| RESISTIVITY | 0.071 Ohm-m |
| pH | 5.100 |

| CATIONS | mg/L | meq/L |
|---|---|---|
| SODIUM | 31,641.4 | 1375.7 |
| CALCIUM | 15,043 | 752.2 |
| MAGNESIUM | 2,448 | 200.7 |
| BARIUM | 90.0 | 1.31 |
| IRON | 22.5 | 0.8 |
| MANGANESE | 3.503 | 0.13 |
| STRONTIUM | 485.60 | 11.08 |

| ANIONS | mg/L | meq/L |
|---|---|---|
| BICARBONATE | 6.1 | 0.1 |
| CHLORIDE | 83,091 | 2340.6 |
| SULFATE | 55 | 1.1 |

| | mg/L |
|---|---|
| TOTAL DISSOLVED SOLIDS | 132,886 |
| TOTAL IONIC STRENGTH | 2.81 |
| TOTAL HARDNESS AS CaCO3 | 47,616 |

CALCIUM CARBONATE SCALING TENDENCY

STABILITY INDEX:

| °F | |
|---|---|
| 50 | -2.73 |
| 68 | -2.55 |
| 77 | -2.45 |
| 86 | -2.36 |
| 104 | -2.14 |
| 122 | -1.87 |
| 140 | -1.57 |
| 158 | -1.24 |
| 176 | -0.86 |
| 194 | -0.45 |
| 212 | -0.01 |

CALCIUM CARBONATE INDEX LEGEND
SI OF LESS THAN 0 = NO POTENTIAL
SI OF 0 TO 0.5 = MARGINAL POTENTIAL
SI OF 0.5 TO 1.0 = MODERATE POTENTIAL
SI OF ABOVE 1.0 = SEVERE POTENTIAL

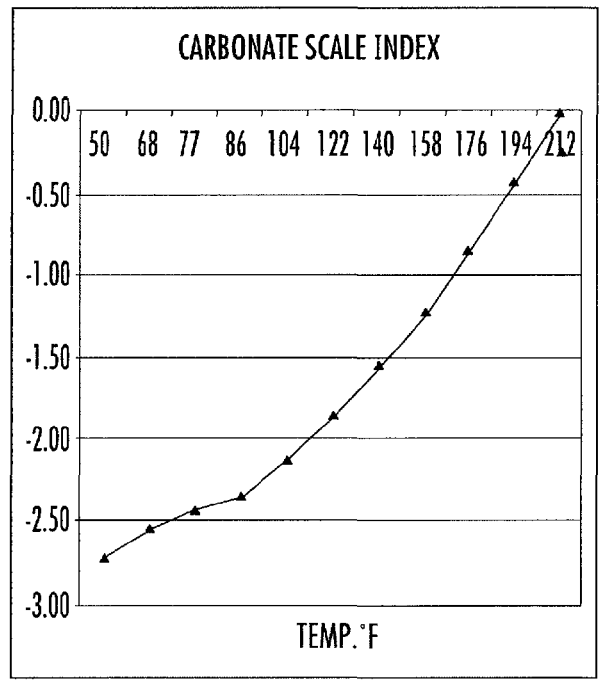

FIG. 14B

REACTOR TANK

CROSS-REFERENCE TO RELATED APPLICATIONS

In accordance with 37 C.F.R. 1.76, a claim of priority is included in an Application Data Sheet filed concurrently herewith. Accordingly, the present invention claims priority as a divisional of U.S. patent application Ser. No. 12/765,971, entitled "Reactor Tank", filed Apr. 23, 2010, now U.S. Pat. No. 8,721,898 B2, which is a continuation-in-part of U.S. patent application Ser. No. 12/399,481, entitled "Enhanced Water Treatment for Reclamation of Waste Fluids and Increased Efficiency Treatment of Potable Waters", filed Mar. 6, 2009, now U.S. Pat. No. 7,699,988, issued Apr. 20, 2010, which is a continuation-in-part of U.S. patent application Ser. No. 12/184,716, entitled "Enhanced Water Treatment for Reclamation of Waste Fluids and Increased Efficiency Treatment of Potable Waters", filed Aug. 1, 2008, now U.S. Pat. No. 7,699,994, issued Apr. 20, 2010, which in turn is a continuation-in-part of U.S. Provisional Patent Application No. 60/953,584, entitled "Enhanced Water Treatment for Reclamation of Waste Fluids and Increased Efficiency Treatment of Potable Water", filed Aug. 2, 2007, the contents of which are hereby expressly incorporated by reference.

FIELD OF THE INVENTION

This invention related to the field of fluid treatment and, in particular, to an improved cavitation reactor cone for effectively destroying aerobic and anaerobic bacteria and reducing both suspended and dissolved solids to address various water treatments.

BACKGROUND OF THE INVENTION

The Applicant has worked extensively with some of the most foul waters imaginable. In many such instances the treatment of such fluids can extremely expensive. For example, the global direct costs to oil companies for treating water used in oil and gas recovery surpassed $20 billion in 2007, with expenses skyrocketing in the following years.

While the instant invention can be used on most any water that is contaminated, it is especially suited for water contaminated with aerobic or anaerobic bacteria, or waters that require the reduction in dissolved or suspended solids. Aerobic bacteria, often called a slime forming bacteria, produces a polysaccharide biofilm that often adheres to the shale and inhibits the flow of gasses. Anaerobic bacteria can be include an acid producing bacteria such as APB that grows on metal and secretes acid producing corrosion, or SRB which is a sulfate reducing bacteria that produces hydrogen sulfide and has the potential to create a dangerous situation and literally shut down a well.

The produced water example will highlight a major problem with contaminated water, produced waters are the byproduct associated with oil and gas production and contain both natural and manmade contaminants. The US Department of Energy (DOE) has called produced water "by far the largest single volume byproduct or waste stream associated with oil and gas production." The DOE further terms its treatment a serious environmental concern and a significantly growing expense to oil and gas producers. While the instant cavitation reactor cone has a beneficial use with most any water treatment problem, the produced water problem highlights the effectiveness of the system.

In 2007, the world's oil and gas fields produced 80 billion barrels of water needing processing. The average is now almost nine barrels of produced water for each barrel of oil extracted. And the ratio of water to hydrocarbons increases over time as wells become older. That means less oil or gas and more contaminated water as we attempt to meet rising global energy needs.

The discharge of produced water is unacceptable unless treated. Currently it is necessary to induce chemical polymers to flocculate the slurry and further treat the volatile organic compounds (VOC's) which are emitted as gases from certain solids or liquids. The VOC's are known to include a variety of chemicals some of which may have short or long term adverse health effects and is considered an unacceptable environmental discharge contaminant. Unfortunately, the use of polymers and a settling time is so expensive that it economically it becomes more conducive to treat the waste off-site which further adds to the cost of production by requiring off-site transport/treatment or shipped to a hazardous waste facility where no treatment is performed.

The applicants developed an Enhanced Water Treatment for Reclamation of Waste Fluids and Increased Efficiency Treatment of Potable Water which employed the use of a cavitation reactor cone. The instant invention is an improvement upon the cavitation reactor cone which advances the developed processes of removing heavy metals, oil sheens, cations and organics at a well site but further provides a device capable of treating numerous other water related problems providing both an economic and environmental benefit.

In addition there are many gas fields, most notably in North America, that contain enormous amounts of natural gas. This gas is trapped in shale formations that require stimulating the well using a process known as fracturing or fracing. The fracing process uses large amounts of water and large amounts of particulate fracing material (frac sands) to enable extraction of the gas from the shale formations. After the well site has been stimulated the water pumped into the well during the fracing process is removed. The water removed from the well is referred to as flowback fluid or frac water. A typical fracing process uses from one to four million gallons of water to fracture the formations of a single well. Water is an important natural resource that needs to be conserved wherever possible. One way to conserve water is to clean and recycle this flowback or frac water. The recycling of frac water has the added benefit of reducing waste product, namely the flowback fluid, which will need to be properly disposed. On site processing equipment, at the well, is the most cost effective and environmentally friendly way of recycling this natural resource.

It takes approximately 4.5 million gallons of fresh water to fracture a horizontal well. This water may be available from local streams and ponds, or purchased from a municipal water utility. This water must be trucked to the well site by tanker trucks, which carry roughly five thousand gallons per trip. During flowback operations, approximately 300 tanker trucks are used to carry away more than one million gallons of flowback water per well for offsite disposal. For a 3 well frac site these numbers will increase by a factor of three.

The present invention provides a cost-effective onsite cavitation reactor cone that combines ozone, ultrasound and electo-precipitation in a single vessel for enhanced water treatment.

SUMMARY OF THE INVENTION

The instant invention is directed to an improved cavitation reactor cone that introduces high intensity acoustic energy and ozone into a conditioning container to provide a mechanical separation of materials by addressing the non-covalent forces of particles or van der Waals force. The invention further discloses a radial entry for effluent to improve better mixture with ozone with the ultrasound transducers used to provide the acoustic energy strategically located within the tank to accelerate mass transfer as well as electrodes to break down contaminants at a faster rate.

Thus an objective of the invention is to provide an improved cavitation reactor cone to treat fluids, the fluids subjected to ozone saturation and flash mixed with hydrodynamic cavitation and dual frequency ultrasonic transducers to initiate dissolved as flotation of oils and suspended solids and the conversion of ozone to hydroxyl radicals.

Yet still another objective of the invention is to disclose the use of a cavitation reactor cone that can be used in treatment of most any type of fluid by providing an effective means to destroy aerobic and anaerobic bacteria, and provide a reduction in contaminants.

Still another objective of the invention is to provide an improved cavitation reactor cone that eliminates the need for biocide and anti-scalant chemical typically employed in frac waters.

Still another objective of the invention is to provide a process to reduce scaling tendencies without the aid of acid, ion exchange processes, or anti scaling chemicals.

Yet still another objective of the invention is to a process for lowering scaling tendencies in frac, flowback water, by reducing the Langelier Saturation Index to below zero.

Another objective of the invention is employ nano-cavitation imploding bubbles to provide the liquid gas interface that is instantaneously heated to approximately 900 degrees Fahrenheit which oxides all organic compounds through sonoluminescence.

Still another objective of the invention is to provide an improved cavitation reactor cone for an on-site process that will lower the cost of oil products by reducing the current and expensive processes used for off-site treatment of waste fluids.

Another objective of the invention is to provide an improved cavitation reactor cone for on-site process that will extend the life of fields and increase the extraction rate per well.

Still another objective of the instant invention is to teach the combination of ultrasonic and hydrodynamic agitation in conjunction with ozone introduction into a closed pressurized generally cone shaped container whereby the cavitations cause disruption of the materials allowing the ozone to fully interact with the contaminated flow back water for enhancement of separation purposes. In addition, anodes in the container provide DC current to the flow back water to drive the electro precipitation reaction for the hardness ions present with the flow back water.

Still another objective is to teach a process of enhanced ozone injection wherein ozone levels can be reduced be made more effective.

Another objective of the invention is to provide a cost effective and environmentally friendly process and apparatus for cleaning and recycling frac water at the well site using transportable equipment.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIGS. 14A and 14B are data tables representing two samples of flow back water. Each data table sets forth the contaminants within the flow back water prior to treatment in the main reaction tank as compared to the same contaminants subsequent to treatment in the main reaction tank.

DETAILED DESCRIPTION OF THE PREFERRED EMBODIMENT

Figure 1:
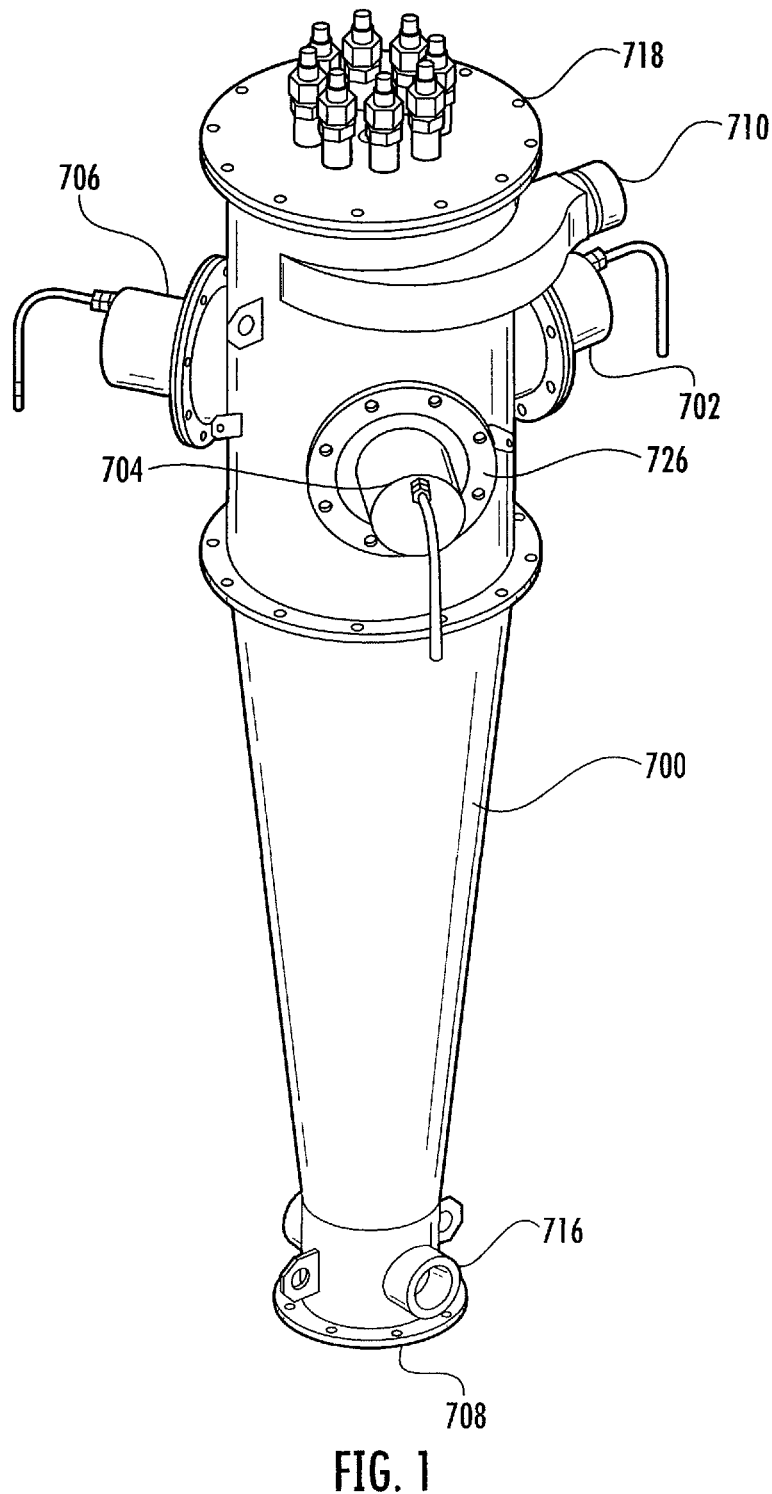
FIG. 1 is perspective view of a cavitation reactor cone.

Now referring to the Figures in general, FIG. 1 illustrates the improved cavitation reactor cone 700 of the instant invention having a generally cone shaped configuration. The cavitation reactor cone includes four ultrasonic transducers assemblies 702, 704, 706 and 708. Each transducer is rated at approximately 500 watts. Three of the transducer assemblies; 702, 704 and 706 are located at the upper portion of the cavitation reactor cone 700 and are spaced approximately 120 degrees apart from one another around the upper portion of the tank. Each of these transducers is directed towards a longitudinal centerline of the tank 700. The fourth transducer, 708, is located at the bottom of the generally cone shaped tank and is directed in a direction that is upwards into and generally along the longitudinal centerline of the tank. The tank includes an inlet 710 communicating with flow conduit 712 that exits into a tangentially oriented tank inlet 714 (as shown in FIG. 15) located adjacent the upper end of tank 700. Flow conduit 712 is curved to conform to the shape at the outer periphery of tank 700. The tank 700 also includes an outlet 716 located at the bottom of the tank near what would be identified as the tip of the generally cone shaped tank. Located at the very top of the cone shaped tank is a removable circular cover plate 718. A plurality of holes are formed around the periphery of plate 718 and are sized and configured to receive fasteners that are threaded into the upper peripheral wall of cone shaped tank 700 thereby sealing the upper end of the tank.

Figure 2:
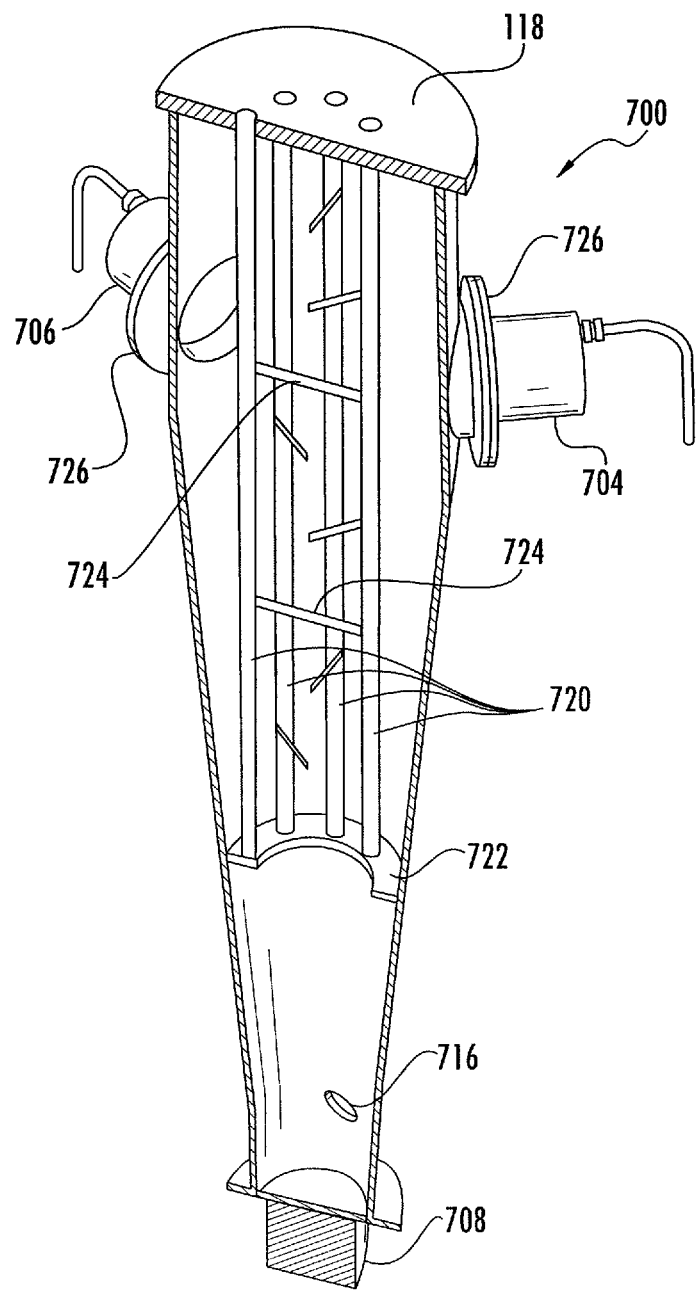
FIG. 2 is a sectional perspective view of the cavitation reactor cone shown in FIG. 1.

As can best be seen in the sectional view of tank 700 in FIG. 2 the cover 718 supports a plurality of electrodes 720 that extend into the tank 700. Electrodes 720 are platinum coated and electrically charged to precipitate hardness salt on the surface of the cone shaped tank. The electrodes 720 are designed to release 20 KW DC power into the effluent. The electrodes 720 are positively charged and therefore serve as anodes within the tank. At the same time the cone shaped tank 700 and transducer assemblies are negatively charged and serve as cathodes. The anode electrodes 720 help to generate hydroxyl radicals from the oxygen molecules thereby facilitating the breakdown of contaminant in the water at a faster rate. The preferred number of rods, as shown, is eight but more or less could be used as well. The rods 720 are supported at the opposite bottom end by annular support ring 722. Braces 724 are used to connect one rod to another and serve to further stabilize the rods 720 within the tank 700.

Figure 3A:
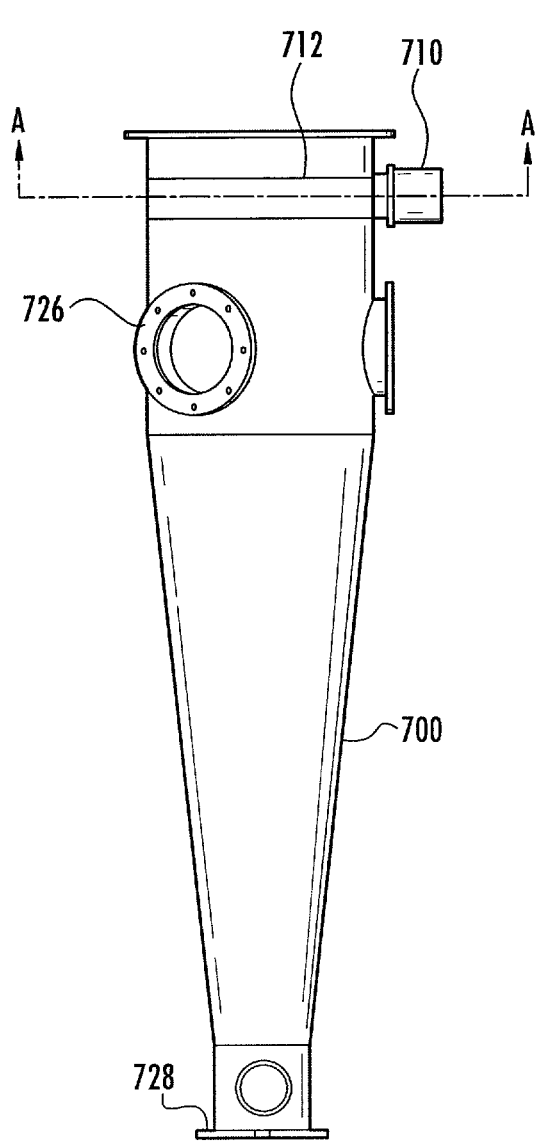
FIGS. 3A and 3B are different side views of the cavitation reactor cone of FIG. 1.
Figure 3B:
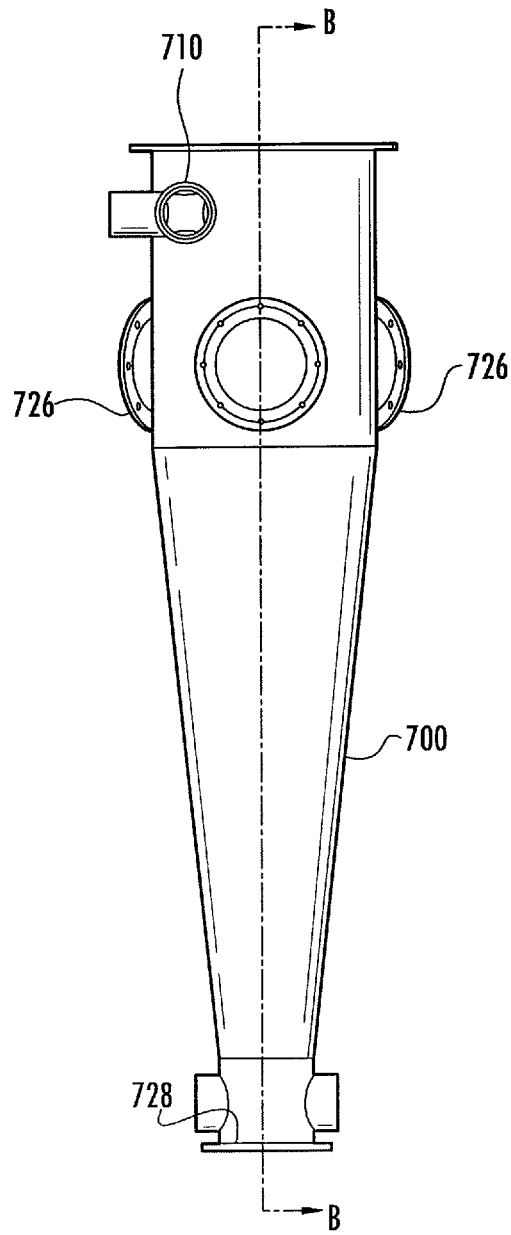
Figure 13:
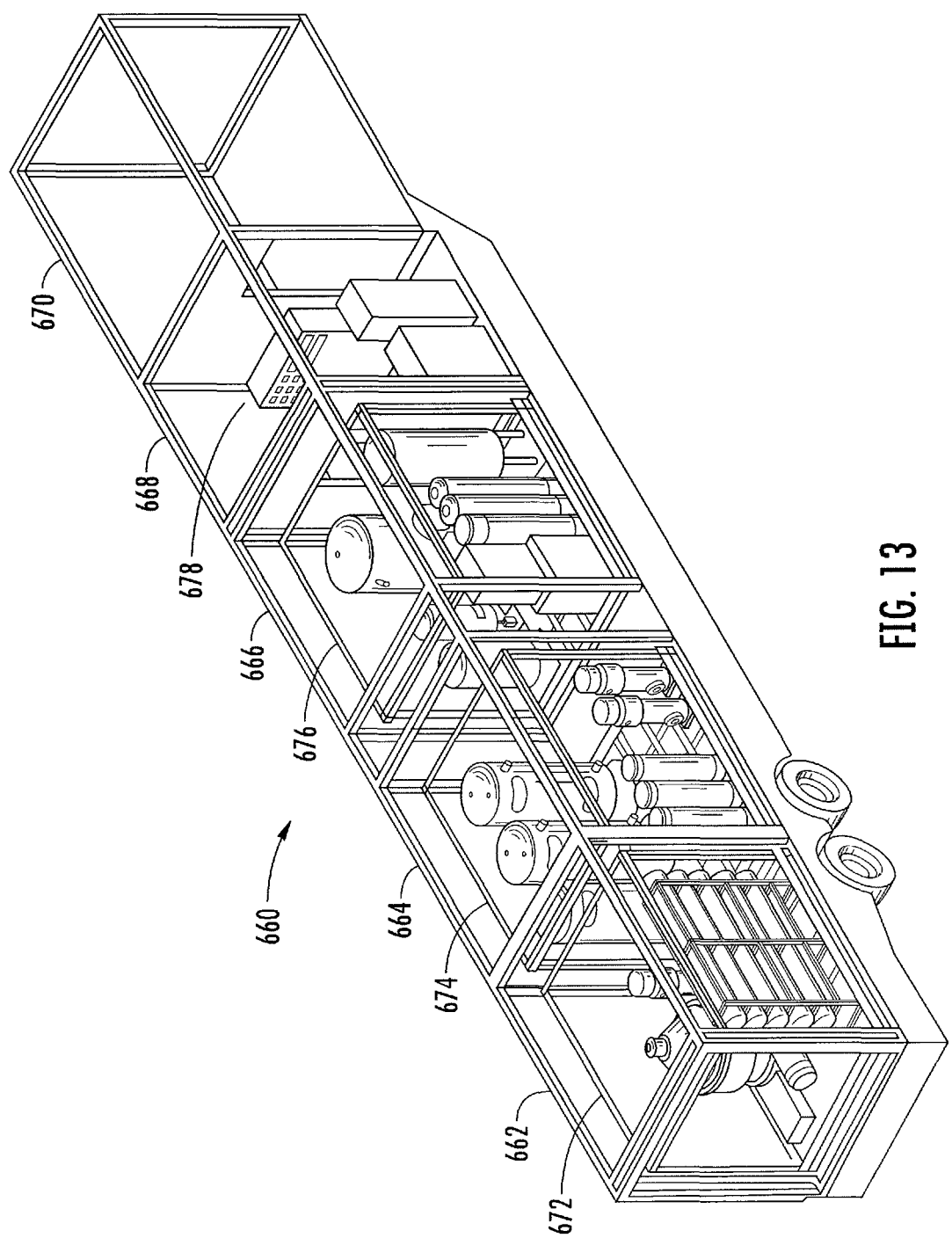
FIG. 13 is a cutaway perspective view of a truck trailer containing the equipment necessary for processing the flow back water at the well site.

FIGS. 3A and 3B are different side views of the tank 700. In these views the ultrasonic transducers 702, 704, 706 and 708 have not been attached to the tank 700. Flanges three flanges 726 are located at the upper portion of the tank and one additional mounting flange 728 is located at the bottom portion near what would be the tip of the cone shaped tank. Flanges 726 and 728 include mounting holes that align with mounting holes in each of the ultrasonic transducer assemblies, as shown in FIG. 13. Suitable fasteners are passed through these holes to securely mount and effectively seal the transducers to the tank.

Figure 4:
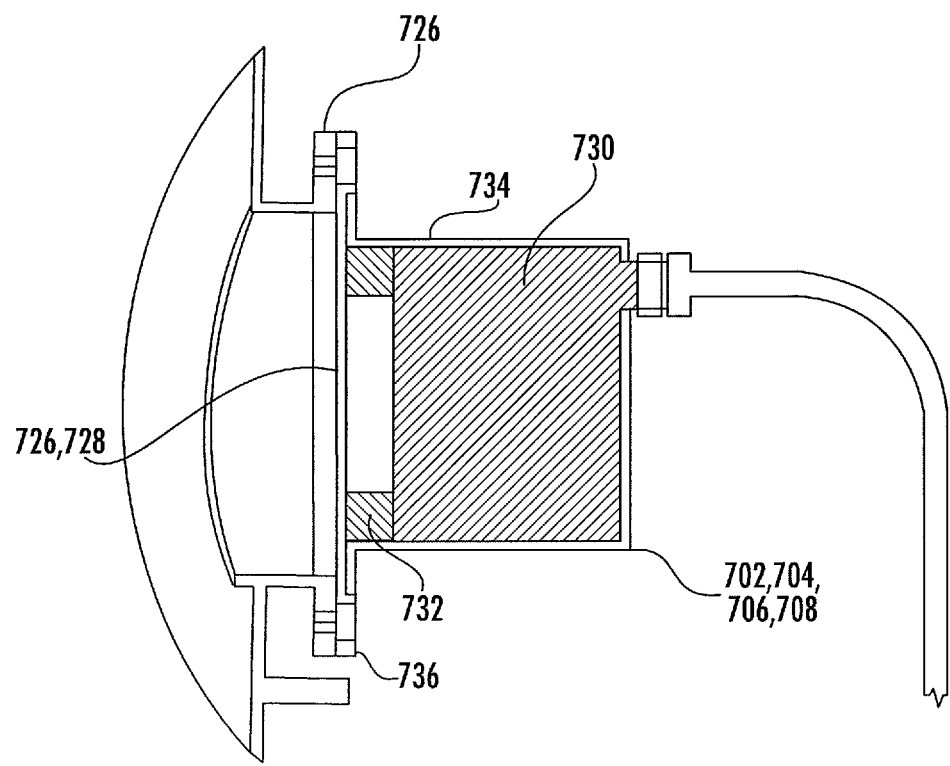
FIG. 4 is a cross sectional view of a transducer assembly and mounting flange arrangement.

FIG. 4 is a sectioned side view of one of the transducer assemblies 702, 704, 706 and 708. Each assembly includes a transducer 730 and a 1000 W annular heating element 732 enclosed within a housing 734 that includes an annular mounting flange 736.

Figure 5:
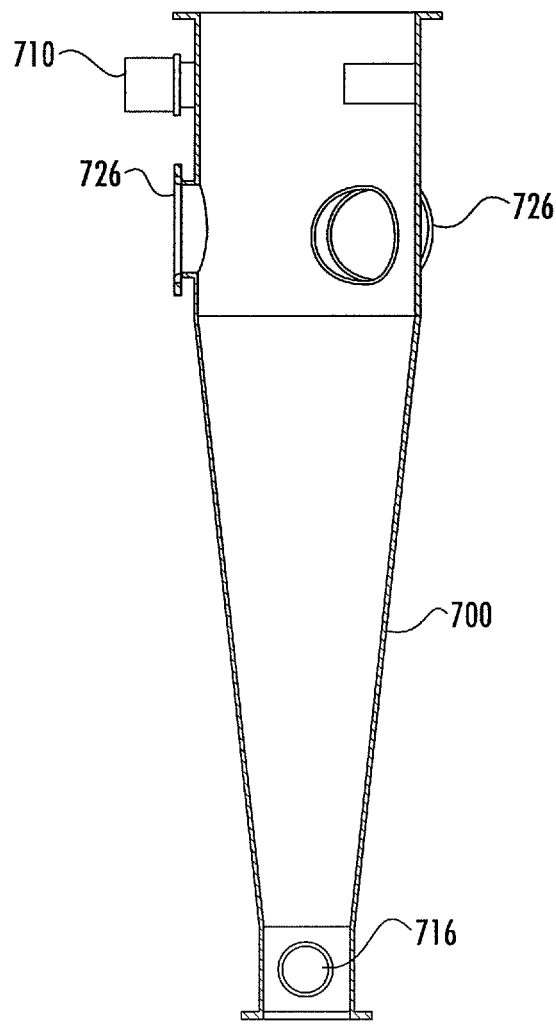
FIG. 5 is a cross sectional view of FIG. 3B taken along lines BB of FIG. 3B.

FIG. 5 is a sectional side view of tank 700. In this view two of the three mounting flanges 726 are illustrated, as well as inlet 710 and outlet 716. The turbulent flow prevents scale formation inside the cone shaped tank 700 thereby allowing the cathode tank 700 and anode electrodes 720 clean as the effluent is processed.

Figure 6:
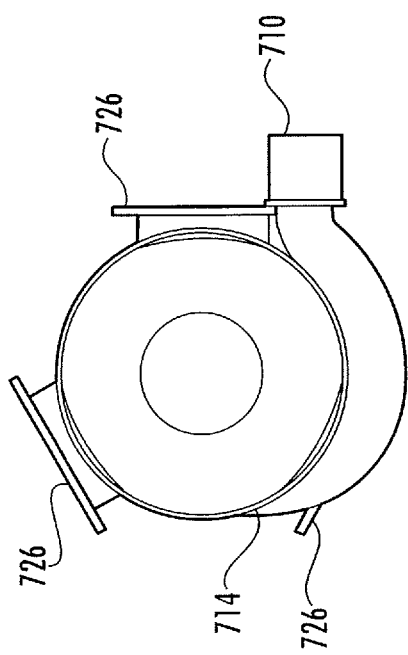
FIG. 6 is a cross sectional top view of the cavitation reactor cone taken along lines AA of FIG. 3A.
Figure 12:
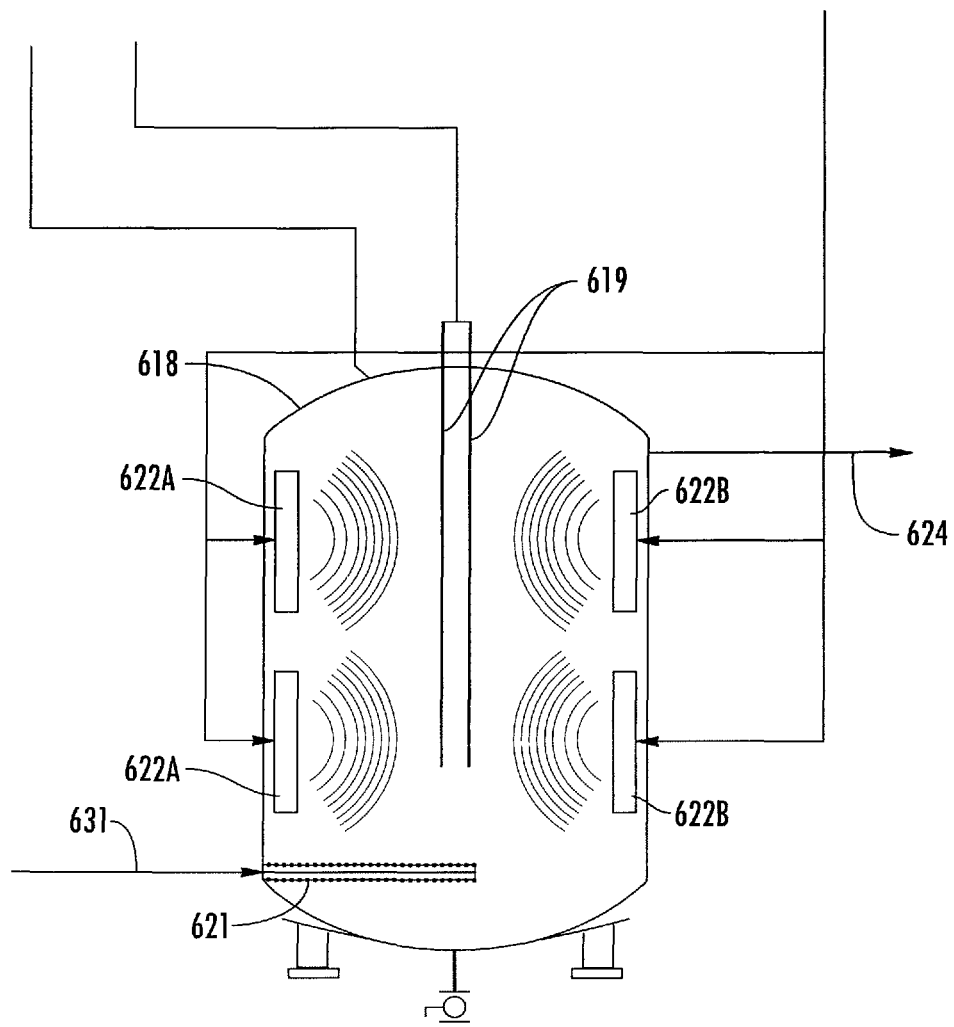
FIG. 12 illustrates the cavitation reactor cone used in the flow processing shown in FIGS. 11a through 11C.

FIG. 6 is a sectioned top view taken along lines A-A of FIG. 12A. Illustrated in this figure is inlet 710 which is fluidly connected to inlet pipe 712 and tank inlet 714. The tangential entry of inlet 714 induces a rotating flow into the tank thereby increasing the mixing of the ozone within the effluent. Ozone within the effluent is introduced at a rate of 360 gr/hr.

Figure 7:
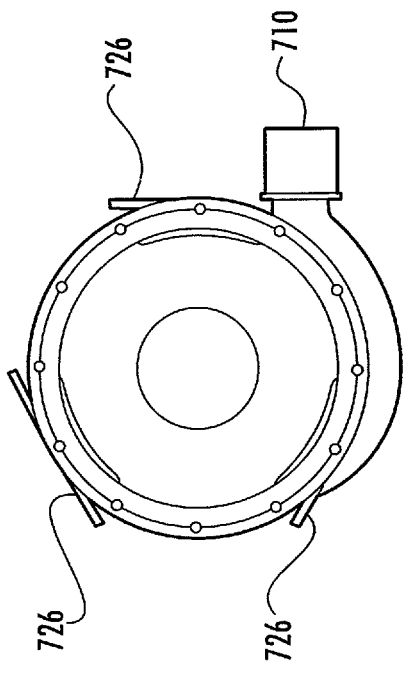
FIG. 7 is top view of the treatment tank of FIG. 1 without a cover plate.

FIG. 7 is a top view of tank 700 with the plate 718 removed. As seen in this view, the upper peripheral wall of the cone shaped tank 700 includes a plurality of bores sized and configured to mate with plate 718. Each of these bores receives a fastening element to thereby seal the upper end of the tank to the plate 718. Also shown in this view is inlet 710 and the three upper mounting flanges 726.

Figure 8:
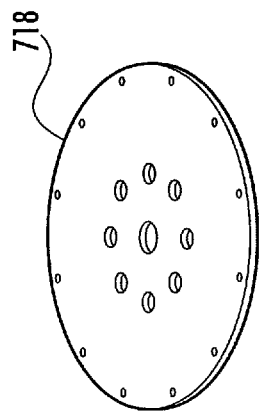
FIG. 8 is a top view of the cover for the treatment tank of FIG. 1.

FIG. 8 is a perspective view of plate 718 showing a plurality of bores configured to receive fasteners such that the plate will be sealed and attached to the tank 700. Likewise, a second series of annularly oriented bores, eight in number as shown, are concentrically located on the plate. The second series of annularly oriented bores are sized and configured to attach and seal the rods 720 to plate 718.

Figure 9:
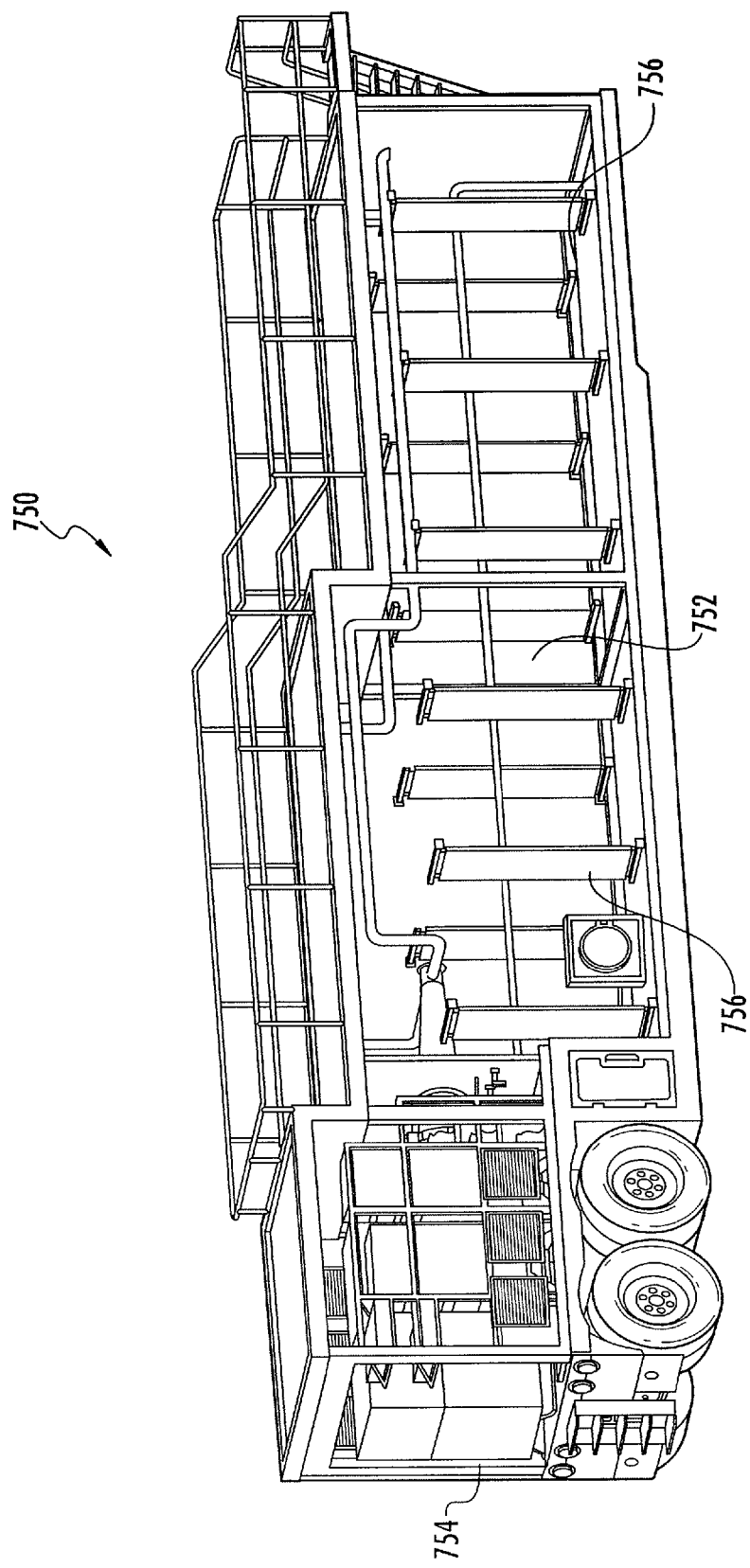
FIG. 9 is a perspective view of a truck trailer designed to disinfect water on the fly prior to the hydro fracing process.

FIG. 9 is a perspective view of the original tank which is capable of destroying microorganisms on a continuous flow basis before the water is used for hydrofracing. As shown the processing equipment and tank are package into a transportable truck trailer 750. The tank compartment 752 is sized to hold approximately 500 bbls of water. The tank compartment 752 contains a plurality of perforated metal plates 756 vertically oriented in a parallel and spaced relationship. The plates 756 are electrically connected to one another on the negative side of a DC power supply. The processing equipment, mounted in the equipment compartment 754 includes; on onboard diesel generator (60 KW, 240, 3 ph, 60 Hz), a DC power supply, two DC current systems to reduce harness salts within the water, an onboard ozone generator, a 15 HP –300 GPM, 50 PSI ozone mixing pump to mix ozone with incoming effluent a cone shaped treatment tank 756 (as shown and disclosed in FIG. 10) with four ultrasonic transducers assemblies each including an annular DC powered heating element.

Figure 10:
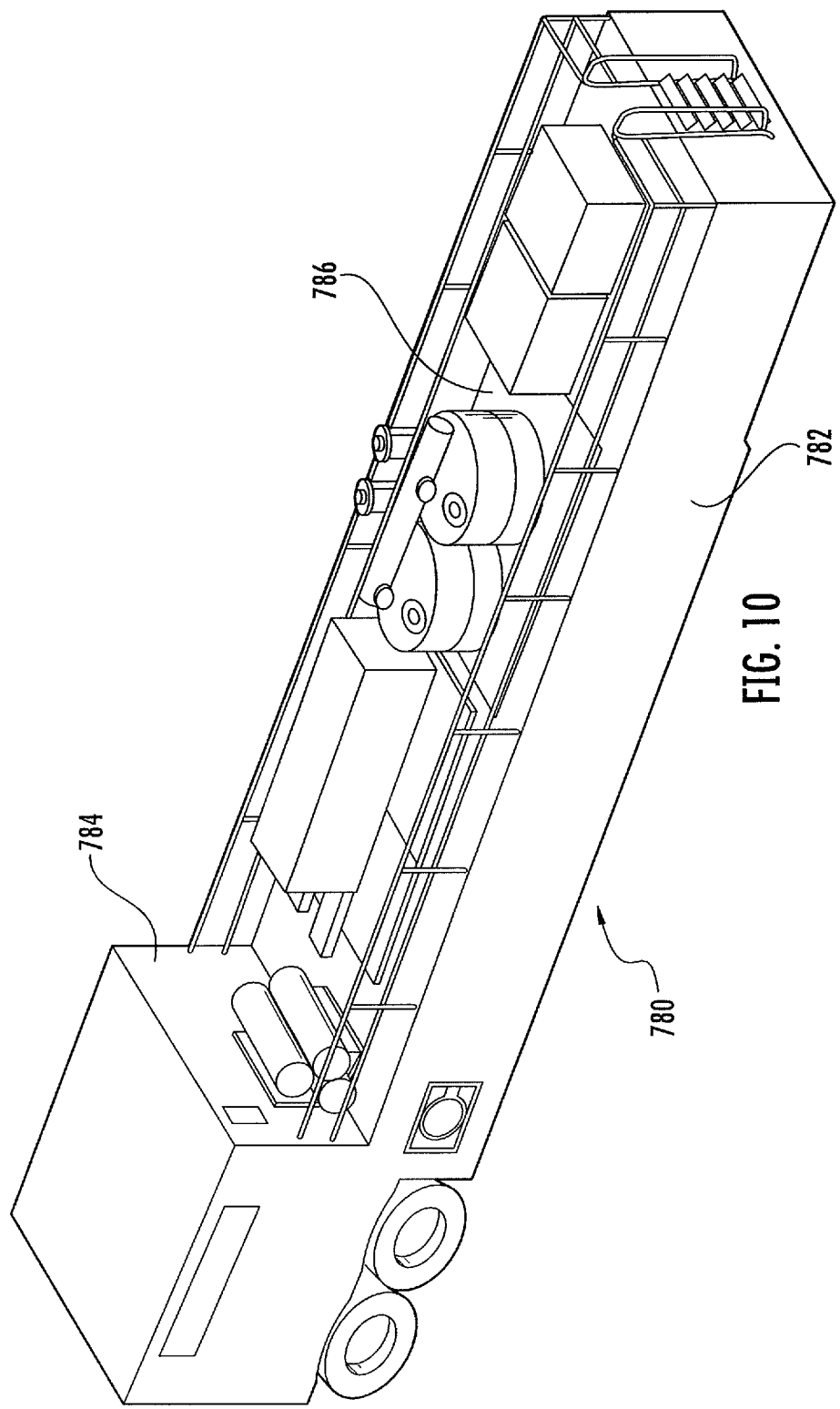
FIG. 10 is a perspective view of a truck trailer designed to process frac flow back and produces water and clean brine that is free from bacteria.

FIG. 10 is a perspective view of a hybrid unit that is designed to process frac flow back and produce both water and clean brine that is free from bacteria. As in the previous embodiment the processing equipment and tank are packaged into a truck trailer 780. This hybrid unit, capable of processing frac flow back at a rate of 600 GPM, can produce clean brine which is then recycled to hydro frac gas formations. The water produced will have cations in colloidal from which will reduce scaling and have a lowered tendency to form a hard scale. The truck trailer 780 includes water holding tank 782, a separate control compartment 784, and an equipment platform 786 located on the top side of the holding tank 782. The hybrid unit includes two cone shaped treatment tanks 788 and 790 (identical to the one shown in FIG. 10), two main suction pumps that operate at 40 psi with a flow rate of 200 GPM, an oxygen generator, an ozone generator that produces 480 GR/hr at 100 LPM, centrifugal filters to separate heavy particulates at different stages of the process, a 100 micron particulate filter for incoming water and a self washing sand and carbon media tank to additionally polish the effluent to 25 micron. The trailer also includes an electrical generator and a 15 KW DC power supply for each treatment tank and an additional DC power supply to release DC current in the tank 782, via perforated plates similar to plates 756 as shown in FIG. 9.

Figure 11A:
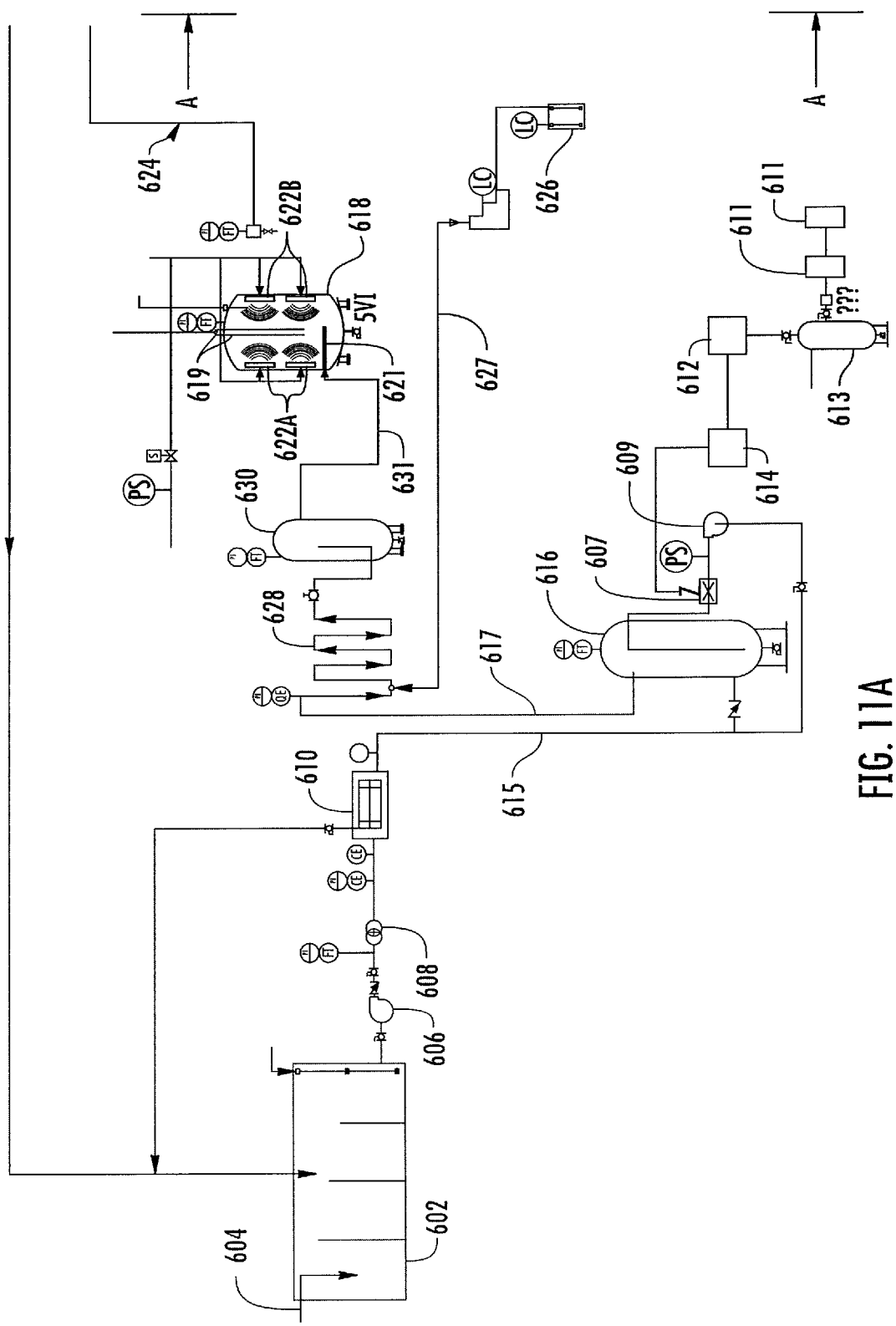
FIGS. 11A, 11B and 11C illustrate an alternative flow diagram for processing flow back water at the well site.
Figure 11B:
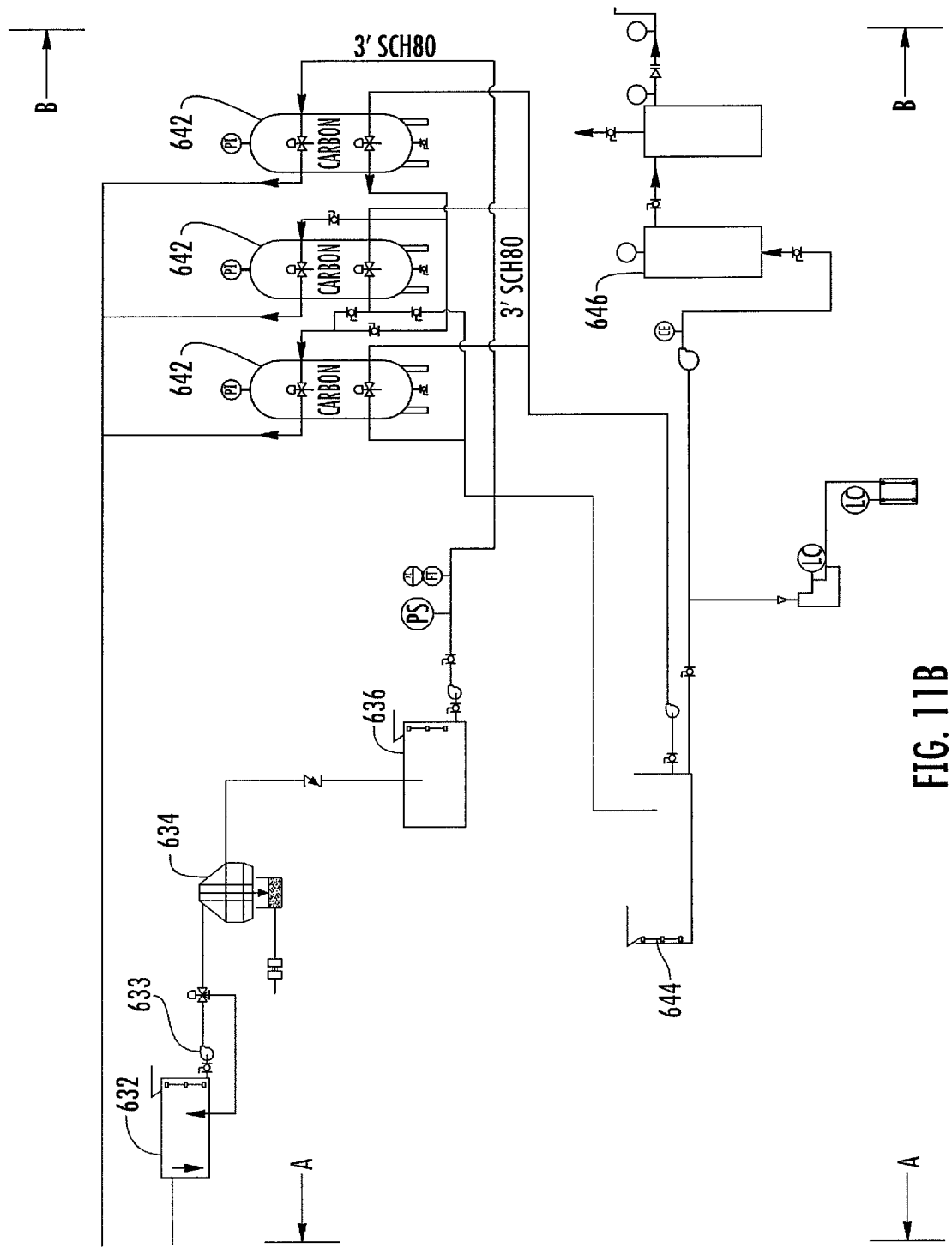
Figure 11C:
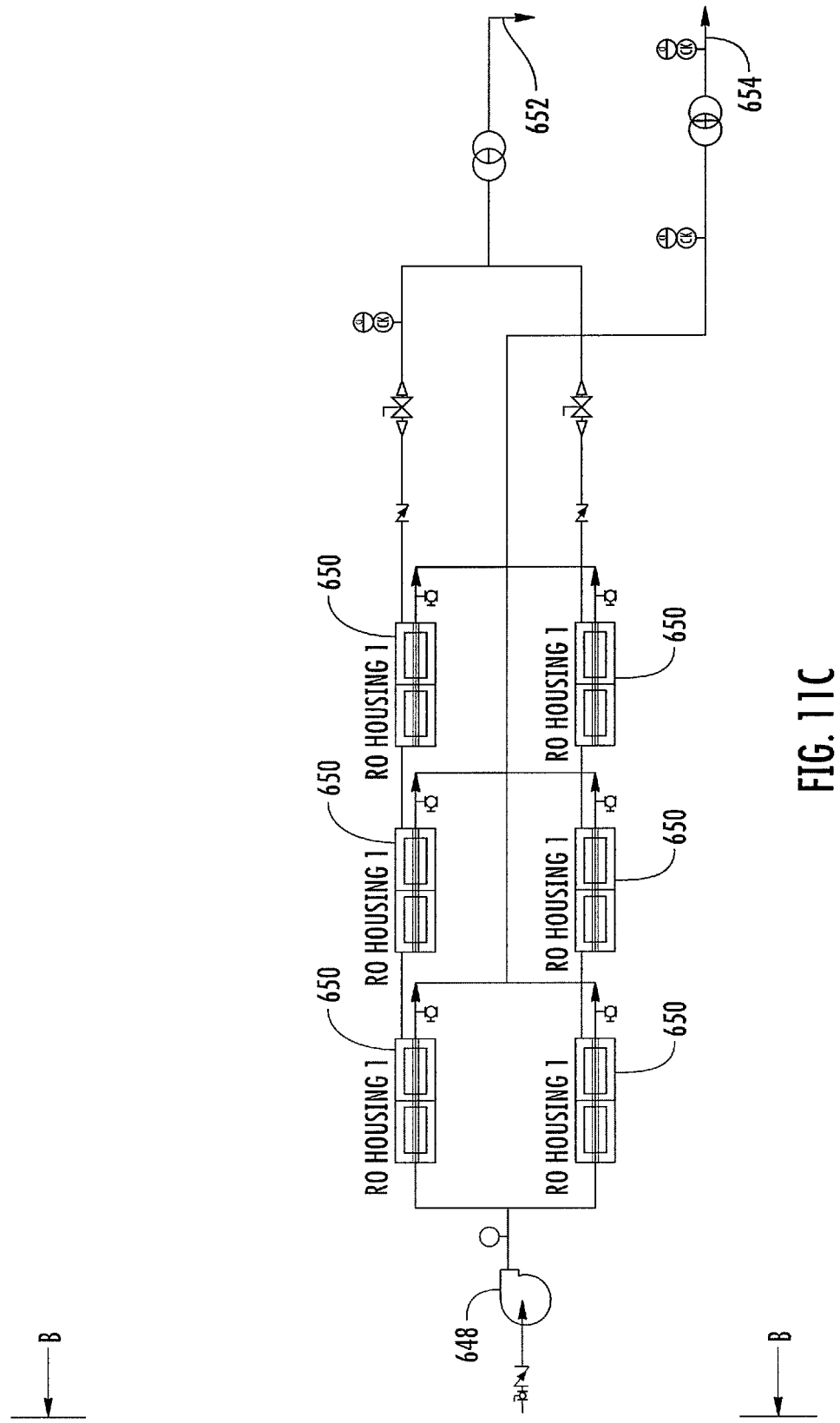

For example, the improved treatment tank operates on some of the most foul fluids, such as drilling fluid. However, it should be noted that the use of drilling fluid is only an example of the types of fluids that can be treated. Produced water from an oil or gas well, or even enhancement of potable water benefits from the improved treatment tank. For example, FIGS. 11A, 11B, and 11C illustrate a frac water fluid treatment process using the previous style treatment tank 618, also illustrated in FIG. 12. This apparatus used in this process is designed to be mounted within a truck trailer such that it can be moved from location to location to treat the frac water on site. Frac water enters frac water process tank 602 through inlet 604. The effluent is removed from tank 602 by pump 606 through flow meter 608 and then through back wash filter 610. Filter 610 removes substances such as frac sands and foreign particles in the range of 25 to 50 microns. From the filter 610 the effluent proceeds via line 615 to ozone treatment tank 616 where it is saturated with ozone. Air enters compressor 613 through dryers 611. Oxygen generator 612 receives compressed air from compressor 613 and feeds ozone generator 614 which in turn feeds ozone to a high efficiency, venturi type, differential pressure injector 607 which mixes the ozone gas with the flowback water. The flowback water enters the injector at a first inlet and the passageway within the injector tapers in diameter and becomes constricted at an injection zone located adjacent the second inlet. At this point the flowback flow changes into a higher velocity jet stream. The increase in velocity through the injection zone results in a decrease in pressure thereby enabling the ozone to be drawn in through the second inlet and entrained into the flowback water. The flow path down stream of the injection zone is tapered outwards towards the injector outlet thereby reducing the velocity of the flowback water. Within injector 607 ozone is injected through a venturi at vacuum of 5 inches of Hg. The pressure drop across the venturi is approximately 60 psi which ensures good mixing of the ozone gas with the effluent and small ozone bubble generation. An ozone booster pump 609 feeds effluent and ozone into injector 607. Line 617 then conveys the output of ozone treatment tank 616 to an in line static mixer 628. The inline static mixture 628 ensures that the bubbles are maintained at the 1 to 2 micron level. Aluminum sulfate from tank 626 is introduced to in line static mixer 628 via line 627. The inline static mixer 628 is comprised of a series of geometric mixing elements fixed within a pipe which uses the energy of the flow stream to create mixing between two or more fluids. The output of in line mixer 628 is then introduced into chemical mixing tank 630. The alum is a coagulating agent with a low pH that coagulates suspended solids and also keeps iron in suspension. The output of mixing tank 630 is then conveyed via line 631 to main cavitation reactor cone 618. The output is introduced through a manifold 621 within the main cavitation reactor cone 618.

The manifold 621 includes orifices designed to create hydrodynamic cavitations with the main cavitation reactor cone 618. By way of example, the diameters of the holes within the manifold 621 are approximately 5 mm and the pressure difference across the manifold is approximately 20 psi. In addition, the main cavitation reactor cone 618 also includes four submersible ultrasonic transducers 622A and 622B positioned at various elevations within the cavitation reactor cone 618. These ultrasonic transducers 622A and 622B are designed to create acoustic cavitations. Each transducer includes a diaphragm that is balanced with the help of a pressure compensation system so that a maximum amount of ultrasonic energy is released into the effluent. The main cavitation reactor cone 618 includes a pair of 16 KHz and a pair of 20 KHz frequency ultrasonic transducers with horns (622A and 622B, respectively). The ultrasonic horns 622A and 622B are installed around the periphery of the tank creating a uniform ultrasonic environment which helps to increase the mass transfer efficiency of the ozone. In addition, the 16 KHz and 20 KHZ horns 622A and 622B are installed opposite to each other inside the tank to create a dual frequency filed that continuously cleans the internal tank surface. The acoustic cavitations generated by the ultrasonic generators 622A and 622B also greatly enhance the oxidation rate of the organic material with ozone bubbles and ensure uniform mixing of the oxidant with the effluent. As shown in FIGS. 6A and 7 main cavitation reactor cone 618 also includes a plurality of anodes 619 within the tank that provides DC current to the effluent and thereby creates oxidants in the water. In this process the DC current drives the electro precipitation reaction for the hardness ions present in the effluent. During this treatment the positively charged cations move towards the electron emitting (negative) cathode which is the shell of the main cavitation reactor cone 618. The negatively charged anions move towards the positive anodes 619. In this process sulfate ions are fed to the cations which either form a scale or are transformed into a colloidal from and remain suspended in the effluent. Some heavy metals are oxidized to an insoluble dust while others combine with sulfate or carbonate ion to make a precipitate under the influence of the electrode. The carbonate and sulfate salt precipitate on the return cathode surface. The ultrasound continuously cleans the precipitation on the return cathode surface and produces small flakes which are removed later in the process during centrifuge separation. The cations which precipitate with sulfate ions are in colloidal form have fewer tendencies to form any scaling and remain in colloidal form through out the process notwithstanding the temperature and pressure. The coagulated suspended solids are then removed in centrifuge separation later in the process. The anodes 619 are made of titanium and are provided with a coating of oxides of Rh and Ir to increase longevity. The anodes 619 are powered by a DC power supply whose power output can be up to 100 volts DC and up to 1000 amps current. The DC power supply can be varied according to targeted effluent. For example, for water effluent with a higher salt content the power supply output would provide less DC voltage and more DC current than water with low levels of salt. The main cavitation reactor cone 618 is maintained at an internal pressure greater than atmospheric.

The effluent then flows through line 624 and into tank 632 and then through feed pump 633 into centrifuge 634 and then into intermediate process tank 636.

The effluent is then passed through three media tanks 642 each containing activated carbon. These filters will polish the effluent further and remove any leftover heavy metals. They will also break down any remaining ozone and convert it into oxygen. The effluent will then be conveyed to tank 644 prior to being introduced to micron filter 646. The filter is capable of filtering material down to one to five microns. The effluent leaving the micron filter passes through an accumulator and is then pressurized via pump 648 prior to entering the reverse osmosis membranes 650. The pump 648 can operate up to 1000 psi separating clean permeate and reject the brine. Outlet 652 carries the concentrated waste product to be conveyed to a reject water tank for reinjection or other suitable disposal. Outlet 654 carries the RO product water to be conveyed to a clean water frac tank for storage and distribution.

FIG. 13 illustrates a cut away view of a modified truck trailer 660 that is designed to transport the frac water processing equipment for the system such as the one disclosed in FIGS. 6A-6C. The trailer is partitioned into discrete areas. As shown, area 662 is designated as the area for the RO equipment and the centrifuge. Area 664 is the area designated for the media and cartridge filters. Similarly, area 666 would contain the ozone producing and treatment equipment as well as the main treatment tank. The control room is installed in compartment 668 and an electrical generator (typically 280 Kw) is installed in compartment 670. The equipment is assembled in a modular fashion. Module 672 includes a centrifuge and RO and ancillary equipment mounted on a skid. Module 674 includes the media and cartridge filters and ancillary equipment that is also mounted on a skid. A third module 676 includes the ozone producing and treatment equipment, the main treatment tank and other supporting equipment also mounted on a moveable skid. By configuring the processing equipment in a modular fashion and placing them on skids that are removable from the truck trailer the system components can be readily replaced. The ability to swap out system component modules substantially minimizes system down time and improves the ability to repair the processing equipment in a quick and efficient manner.

FIGS. 14A and 14B represent data tables from two samples of flow back water analyzed for levels of various dissolved gases, cations, anions and fluid conditions using standard protocols as known to one of skill in the art. The data in FIG. 14A sets forth the properties of the flow back water prior to treatment in the main reaction tank. The data in FIG. 14B sets for the properties of the flow back water subsequent to treatment in the main reaction tank. Although not illustrated, samples after treatment were taken at 15 minute intervals for 1 hour to ensure proper comparison between the pre and post treated flowback water. As can be seen from the tables, the main treatment tank will remove substantial amounts of bicarbonate from the flow back water.

In order to reuse the treated frac water it is important that it have a low scaling tendency. The Langelier Saturation Index (LSI) is an equilibrium model derived from the theoretical concept of saturation and provides an indicator of the degree of saturation of water with respect to calcium carbonate. The LSI is probably the most widely used indicator of cooling water scale potential. It is an equilibrium index which is correlated with the thermodynamic driving force for calcium carbonate scale formation and growth. As used herein, the Langelier Saturation Index is defined as, $LSI=pH-PH_s$ where pH is the measured water pH and $pH_s$ is the pH at saturation in calcite or calcium carbonate. The numerical value for $pH_s$ is calculated using the equation, $PH_s=(9.3+A+B)-(C+D)$, where $A=(Log_{10}[\text{Total Dissolved Solids}]-1)/10$, $B=(-)13.12 \times Log_{10}(°C.+273)+34.55$, $C=Log^{10}[Ca^{2+}$ as $CaCo_3]-0.4$, and $D=Log_{10}[\text{alkalinity as CaCo3}]$. Negative LSI values indicate no potential to scale and water dissolving in $CaCO_3$. Positive LSI values indicate possible scale formation and possible $CaCO_3$ precipitation. Values close to zero are indicative of borderline scale potential. FIGS. 14A and 14B show in tabular and graphic format the calcium carbonate scaling tendency as a function of temperature. As is clearly illustrated, the scaling tendency of the treated frac water is less than zero up to a temperature of 212° F. whereas the raw untreated frac water has a negative scaling index up to between 86 and 104° F. The ability to effectively treat the raw frac water such that the calcium carbonate scaling tendency is reduced to an acceptable level without the use of acids, ion exchange materials, or anti scaling chemicals which is of economical and environmental significance and benefit. In addition to the Langelier Saturation Index (LSI) other indices have found wide acceptance such as the Ryznar Stability Index, the Puckorius Equilibrium Index, the Larson-Sklod Index, the Stiff-Davis Saturation Index, the Barite Saturation Level, the Calcite Saturation Level, the Gypsum Saturation Level, the Strontianite Saturation Level, and the Oddo-Tomson Saturation Index.

The theory of operation behind the main treatment is as follows. The mass transfer of ozone in the flow back water is achieved by hydrodynamic and acoustic cavitations. In the pressurized tank the ozonated flow back water is mixed with incoming flow back water by a header having many small orifices. The phenomenon of hydrodynamic cavitations is created as the pressurized flow back water leaves the small orifices on the header. The dissolved ozone forms into millions of micro bubbles which are mixed and reacted with the incoming flow back water. As the flow back water flows upwards through the reaction tank ultrasonic transducers located around the periphery of the tank at different locations emit 16 KHz and 20 KHz waves in the flow back water.

A sonoluminescence effect is observed due to acoustic cavitation as these ultrasonic waves propagate in the flow back water and catch the micro bubbles in the valley of the wave. Sonoluminescence occurs whenever a sound wave of sufficient intensity induces a gaseous cavity within a liquid to quickly collapse. This cavity may take the form of a pre-existing bubble, or may be generated through hydrodynamic and acoustic cavitation. Sonoluminescence can be made to be stable, so that a single bubble will expand and collapse over and over again in a periodic fashion, emitting a burst of light each time it collapses. A standing acoustic wave is set up within a liquid by four acoustic transducers and the bubble will sit at a pressure anti node of the standing wave. The frequencies of resonance depend on the shape and size of the container in which the bubble is contained. The light flashes from the bubbles are extremely short, between 35 and few hundred picoseconds long, with peak intensities of the order of 1-10 mW. The bubbles are very small when they emit light, about 1 micrometer in diameter depending on the ambient fluid, such as water, and the gas content of the bubble. Single bubble sonoluminescence pulses can have very stable periods and positions. In fact, the frequency of light flashes can be more stable than the rated frequency stability of the oscillator making the sound waves driving them. However, the stability analysis of the bubble shows that the bubble itself undergoes significant geometric instabilities, due to, for example, the Bjerknes forces and the Rayleigh-Taylor instabilities. The wavelength of emitted light is very short; the spectrum can reach into the ultraviolet. Light of shorter wavelength has higher energy, and the measured spectrum of emitted light seems to indicate a temperature in the bubble of at least 20,000 Kelvin, up to a possible temperature in excess of one mega Kelvin. The veracity of these estimates is hindered by the fact that water, for example, absorbs nearly all wavelengths below 200 nm. This has led to differing estimates on the temperature in the bubble, since they are extrapolated from the emission spectra taken during collapse, or estimated using a modified Rayleigh-Plesset equation. During bubble collapse, the inertia of the surrounding water causes high speed and high pressure, reaching around 10,000 K in the interior of the bubble, causing ionization of a small fraction of the noble gas present. The amount ionized is small enough for the bubble to remain transparent, allowing volume emission; surface emission would produce more intense light of longer duration, dependent on wavelength, contradicting experimental results. Electrons from ionized atoms interact mainly with neutral atoms causing thermal bremsstrahlung radiation. As the ultrasonic waves hit a low energy trough, the pressure drops, allowing electrons to recombine with atoms, and light emission to cease due to this lack of free electrons. This makes for a 160 picosecond light pulse for argon, as even a small drop in temperature causes a large drop in ionization, due to the large ionization energy relative to the photon energy.

By way of example, the instant invention can be used to treat produced water containing water soluble organic compounds, suspended oil droplets and suspended solids with high concentration of ozone and ultrasonic waves resulting in degrading the level of contaminants.

CASE 1: Processing Fluid (Effluent) from Oil Drilling Well

Objective: To increase the efficiency of mechanical centrifugal Separation by treating effluent generated from oil drilling operation with Ozone and Ultrasonic waves.

The main constituent of effluent is bentonite. Bentonite consists predominantly of smectite minerals montmorillonite. Smectite are clay minerals of size less than 2~5 microns. Mainly traces of silicon (Si), aluminum (Al), Magnesium (Mg), calcium (Ca) salts found in the bentonite. The percentage of solids (bentonite) in effluent varies from 40% to 60%. Also contaminants oil, grease, VOC are found in the effluent.

Anticipated Effect of Ozone and Ultrasonic on effluent:

Ozone 40 is introduced into the tank 20 in form of micro bubbles which starts oxidation reactions where the organic molecules in the effluent are modified and re-arranged. The bonding between bentonite molecules with water is broken down by hydrodynamic cavitations caused by imploding micro bubbles of ozone with bentonite.

The mass transfer of ozone into effluent is further enhanced by subjecting the effluent with ultrasonic submersible transducers 24 and 26 located at various elevations in the tank. The ultrasonic wave (range from 14 KHz to 20 KHz) propagates through water causing acoustic cavitations. This helps ozone to react with bentonite irrespective of temperature and pH, coverts into collided slimy sludge mass, suspended in water.

The oxidation process of ozone improves color of the water from grey to white. During the process soluble organic compounds broke down into carbon dioxide and oxygen molecules.

As water travels from bottom 22 to the top 23 of the tank 20, volatile organic compounds are collected at the top of the tank, which can be drained out with the help of outlet 50 provided.

Main effluent is piped 48 to centrifuge where the efficiency of separation is expected to increase by 30-40%.

Case II: Produced Water from Offshore Drilling Well

Main properties of this effluent is

Color/Appearance: Black.

Total suspended solids: 9500 ppm

Total dissolved solids: 3290 ppm

Chemical Oxygen demand: 3370 ppm

Biological Oxygen Demand: 580 ppm pH: 7.88

Oil and Grease: 17.2 mgHX/l

The effluent2 has peculiar H2S odor.

Effect of Ozone and Ultrasonic Waves:

Ozone 40 is introduced into the tank 20 in the form of micro bubbles which starts oxidation reactions where the organic molecules in the effluent are modified and re-arranged. The suspended solids are separated and are broken down by hydrodynamic cavitations caused by imploding micro bubbles of ozone. This helps suspended solids coagulate. The oxidation process of ozone improves the color, eliminate the odder and convert suspended solids into inert particle.

The mass transfer of ozone into effluent is further enhanced by subjecting the effluent with ultrasonic submersible transducers 24 & 26 located at various elevations in the tank. Greater mass transfer of ozone into effluent is achieved irrespective of temperature or pH of water. The ultrasonic wave (range from 14 KHz to 20 KHz) propagates through water causing acoustic cavitations. This helps ozone to react better separating volatile organic compounds, suspended solids from water molecule. During the process soluble organic compounds broke down into carbon dioxide and oxygen molecules.

The expected results after Ozonix® Process on effluent 2 are:

Color/Appearance: pale yellow, colorless

Total suspended solids: less than 40 ppm

Total dissolved solids: less than 30 ppm

Chemical Oxygen demand: less than 10 ppm

Biological Oxygen Demand: less than 10 ppm pH: 7

Oil and Grease: less than 5 ppm

Odorless.

Case III: Treatment of Flowback or Frac Water with Mobile Equipment.

The typical flowback fluid contains the following contaminants:

| | |
|---|---|
| Iron | 60.2 mg/L |
| Manganese | 1.85 mg/L |
| Potassium | 153.0 mg/L |
| Sodium | 7200 mg/L |
| Turbidity | 599 NTU |
| Barium | 14.2 mg/L |

-continued

| | |
|---|---|
| Silica | 36.9 mg/L |
| Stontium | 185 mg/L |
| Nitrate | 0.0100 U mg/L |
| Nitrite | 0.0200 U mg/L |
| TSS | 346 mg/L |
| TDS | 33800 mg/L |
| Oil + Grease (HEM) | 9.56 mgHx/L |
| Calcium Hardness | 4690 mg/L |
| Magnesium Hardness | 967 mg/L |
| Specific Conductance | 51500 umhos/cm |
| Ammonia (as N) Unionized | 67.8 mg/L |
| Chloride | 19300 mg/L |
| Sulfate | 65.0 mg/L |
| Total Phosphorous (as P) | 2.07 mg/L |
| TOC | 163 mg/L |
| Bicarbonate CaCO3 | 404 mg/L |
| Bicarbonate HCO3 | 247 mg/L |
| Carbonate CO3 | 0.100 U mg/L |
| Carbonate CaCO3 | 0.100 U mg/L |

Contaminants are eliminated at various stages of the filtration system.

During the pretreatment stage the frac, flowback water, is pumped through 50 micron filter 610 which includes an automatic backwash feature. This filter removes substances like frac sands, and foreign particles above 50 microns in size. Approximately 70 percent of the frac water is then saturated with ozone in the ozone contact tank 616 with the remainder, approximately 30 percent, directed to the main cavitation reactor cone 318. The effluent from the ozone contact tank 616 is introduced through a manifold 621 within the cavitation reactor cone 618. The manifold includes orifices designed to create hydrodynamic cavitations with the main cavitation reactor cone. In addition the cavitation reactor cone 618 also includes ultrasonic transducers 322 positioned as various elevations within the cavitation reactor cone 318. These ultrasonic transducers 622 are designed to create acoustic cavitations. The combination of both acoustical and ultrasonic cavitations causes the maximum mass transfer of ozone within the treatment tank in the shortest period of time. This process oxidizes all the heavy metals and soluble organics and disinfects the effluent. The process within the main cavitation reactor cone 618 also causes the suspended solid to coagulate thereby facilitating their separation during centrifugal separation. Additionally, to coagulate all the oxidized metals and suspended solids aluminum sulfate (Alum) is added to the main cavitation reactor cone 618 before the centrifugal separation.

All suspended solids are removed in the disc bowl centrifuge. The suspended solids are collected at the periphery of the disc bowl centrifuge 634 and intermittently during desludging cycles. At this point in the process the effluent is free from all suspended solids, heavy metals, and soluble organics. The effluent is then passed through an ultra-violet light using 185 nm wavelength to remove all organic carbon. The total organic carbon (TOC) is broken down into CO2 in the presence of hydroxyl radical present in the affluent.

The effluent is then passed through three media tanks 642 containing activated carbon. These filters serve to further polish the effluent and remove any left over heavy metals. In addition the media tanks also break down any remaining ozone and convert it into oxygen. At this stage of filtration the effluent is free from soluble and insoluble oils, heavy metals, and suspended solids.

The effluent is then passed through reverse osmosis (RO) filtration. The RO feed pump passes the effluent through a 1 micron filter 646 which is then fed to five high pressure RO pumps. The RO pumps 648 can operate up to 1000 psi thereby separating permeate and rejecting the brine. To avoid scaling the RO membranes 650 anti-scalant material is fed into the suction inlet of the RO pump. The clean permeate has total dissolved salts in the range of 5-50 PPM. By way of example, is the system is processing 45,000 PPM TDS effluent the resultant TDS in RO reject water will be approximately 80,000 PPM.

It is to be understood that while certain forms of the invention is illustrated, it is not to be limited to the specific form or process herein described and shown. It will be apparent to those skilled in the art that various changes may be made without departing from the scope of the invention and the invention is not to be considered limited to what is shown and described in the specification and drawings.

What is claimed is:

1. A cavitation reactor cone for water treatment comprising:
   a generally cone shaped tank having an upper portion, a lower portion and a conical intermediate portion located between said upper and lower portion, said upper portion being circular in cross section and having a first diameter, said conical intermediate portion being circular in cross section, said conical intermediate portion having a diameter that is equal to the diameter of the upper portion at a first end a smaller diameter equal to the diameter of the lower portion at a second end;
   said upper portion of said tank including an inlet sized and configured to introduce effluent tangentially into said tank whereby a rotating flow is induced in said effluent and further including an outlet located is said lower portion;
   said upper portion further including a plurality of ultrasonic transducers directed at the effluent within said tank;
   said tank further including a plurality of electrodes supported within said tank, said electrodes being electrically connected to a positive charge of a DC power supply, and said cone shaped tank being electrically connected to a negative charge of a DC power supply.

2. The cavitation reactor cone of claim 1, wherein ozone is mixed with the effluent prior to introduction into said tank.

3. The cavitation reactor cone of claim 2, wherein said plurality of ultrasonic transducers are equally spaced around the circumference of the upper portion of said tank.

4. The cavitation reactor cone of claim 3, wherein there are three ultrasonic transducers that are spaced 120 degrees apart from one another.

5. The cavitation reactor cone of claim 2 wherein said plurality of electrodes are cylindrical rods that extend through said upper portion and extend partially through said conical intermediate portion.

6. The cavitation reactor cone of claim 2 further including a plate attached to the upper portion of said tank, said plate supporting said electrodes that are electrically connected to the positive charge of a DC power supply.

7. The cavitation reactor cone of claim 6 wherein said conical intermediate portion includes an annular ring mounted on an interior surface of said conical intermediate member, said annular ring providing additional support for said electrodes.

8. The cavitation reactor cone of claim 7 further including a plurality of braces each connecting a pair of cylindrical rods to one another thereby providing additional stability to said electrodes.

9. The cavitation reactor cone of claim 2 wherein each of said ultrasonic transducers is mounted adjacent to an electric heating device.

10. The cavitation reactor cone of claim 9 wherein said heating device is in the form of an annular ring.

11. The cavitation reactor cone of claim 10 wherein each one of said ultrasonic transducers and each one of said heating devices is contained within a housing to form an assembly that is sized and configured to be attached to said tank with fastening elements.

12. The cavitation reactor cone of claim 2 wherein said lower portion of said tank includes an additional ultrasonic transducer.

13. The cavitation reactor cone of claim 12 wherein said lower portion being generally circular in cross section and having a first end attached to said conical intermediate portion and a second opposite and sealingly attached to said additional ultrasonic transducer.

14. The cavitation reactor cone of claim 13 wherein said outlet is located in a side wall of the lower portion of said tank.

15. The cavitation reactor cone of claim 12 wherein said additional ultrasonic transducer is mounted adjacent to an additional electric heating device.

16. The cavitation reactor cone of claim 15 wherein said heating device is in the form of an annular ring.

17. The cavitation reactor cone of claim 16 wherein said additional ultrasonic transducer and said additional heating device are contained within a housing to form an assembly that is sized and configured to be attached to said tank with fastening elements.

18. The cavitation reactor cone of claim 2 wherein said tank is mounted on a transportable truck trailer.

19. The cavitation reactor cone of claim 18 wherein said truck trailer further includes an additional holding tank having electrically charged plates, an oxygen generator, an ozone generator, an electrical generator, and a plurality of DC power supplies wherein the treatment tank is capable of disinfecting water.

20. The cavitation reactor cone of claim 19 configured such that the disinfected water is injected into a geological formation to hydro frac gas formations.

21. The cavitation reactor cone of claim 18 wherein said truck trailer further includes a second treatment tank, an additional holding tank having electrically charged plates, an oxygen generator, an ozone generator, an electrical generator, a plurality of DC power supplies, micron particulate filters, centrifugal filters, and a sand and media tank, wherein the treatment tanks are capable of processing frac flow back water and produce both water and clean brine that are free from bacteria.

* * * * *